(12) United States Patent
Nevo et al.

(10) Patent No.: US 7,274,855 B2
(45) Date of Patent: Sep. 25, 2007

(54) OPTICAL MICRO-ACTUATOR

(75) Inventors: Doron Nevo, Ra'anana (IL); Ram Oron, Rehovot (IL); Moshe Oron, Rehovot (IL)

(73) Assignee: KiloLambda Technologies Ltd., Tel-Aviv (IL)

( * ) Notice: Subject to any disclaimer, the term of this patent is extended or adjusted under 35 U.S.C. 154(b) by 0 days.

(21) Appl. No.: 10/528,608

(22) PCT Filed: Sep. 22, 2003

(86) PCT No.: PCT/IB03/04145

§ 371 (c)(1),
(2), (4) Date: Mar. 21, 2005

(87) PCT Pub. No.: WO2004/027458

PCT Pub. Date: Apr. 1, 2004

(65) Prior Publication Data

US 2006/0088268 A1    Apr. 27, 2006

(51) Int. Cl.
*G02B 6/00* (2006.01)
(52) U.S. Cl. .................................................. 385/147
(58) Field of Classification Search .......... 385/27–32, 385/140, 147; 359/227–236; 250/229; 356/437
See application file for complete search history.

(56) References Cited

U.S. PATENT DOCUMENTS

| 4,002,897 | A |   | 1/1977  | Kleinman et al. |
|-----------|---|---|---------|-----------------|
| 4,334,321 | A | * | 6/1982  | Edelman ..................... 398/134 |
| 4,503,564 | A |   | 3/1985  | Edelman et al. |
| 4,766,607 | A |   | 8/1988  | Feldman |
| 5,152,748 | A | * | 10/1992 | Chastagner ............... 604/95.05 |
| 5,796,097 | A | * | 8/1998  | Lawrence ................... 250/229 |
| 2001/0005272 | A1 |   | 6/2001 | Buchholz |
| 2006/0088268 | A1 | * | 4/2006 | Nevo et al. ................. 385/140 |

FOREIGN PATENT DOCUMENTS

JP              05180148 A  *  7/1993

* cited by examiner

*Primary Examiner*—Quyen P Leung
(74) *Attorney, Agent, or Firm*—Nixon Peabody LLP (57) ABSTRACT

An optically driven actuator, such as a microactuator, is provided in which light is used to cause linear or angular mechanical or micromechanical motion. The actuator includes a solid light-absorbing and expanding member having an internal partially absorbing and partially reflecting cavity; and a waveguide for directing optical energy into the cavity to cause the light-absorbing and expanding member to expand, thereby resulting in displacement of the actuator. The mechanical or micromechanical motion may be used in optical power control elements, switches, shutters and the like, or perform other functions in combined optical waveguide and electrical or electronic systems.

24 Claims, 8 Drawing Sheets

OPTICAL MICRO-ACTUATOR

FIELD OF THE INVENTION

The present invention relates to optically driven micro-actuators, in which light is used to cause linear or angular mechanical or micromechanical motion.

BACKGROUND OF THE INVENTION

A large variety of actuators creating linear or angular movements are used in mechanical and micromechanical subsystems. Such actuators are based on mechanical, thermal, electrostatic, magnetic, hydraulic, pneumatic and piezoelectric movement principles. Novel actuator systems may include more than one movement or actuating principle. The actuators transfer mechanical, thermal, electrostatic, magnetic, hydraulic, pneumatic and piezoelectric energy into mechanical linear or angular movements. This movement, being proportional to the input signal, can be used to control various processes and to serve as an output of a control sub-system.

Fiber lasers, fiber optics for communications, and other systems for light delivery in medical, industrial and remote-sensing applications can handle high optical powers, namely, optical powers up to several watts in single fibers or waveguides. If these large specific intensities (power/unit area) are introduced into systems, and part or all of the optical power can be used as an energy source for actuation, a novel kind of actuator can be developed, i.e. light-operated optical actuators, in which the input energy to the actuator is light. This is the subject of the present invention. Light is transformed by the actuator into linear or angular movement, thus being useful as a direct optical actuator.

SUMMARY OF THE INVENTION

According to one embodiment of the present invention an optically driven actuator, such as a microactuator, is provided in which light is used to cause linear or angular mechanical or micromechanical motion.

Optically-driven actuators are provided in which light is used to cause a mechanical or micromechanical motion to be used in optical waveguide or optical fiber systems. The mechanical or micromechanical motion may be used in optical power control elements, switches, shutters, and other functions.

Optically-driven actuators in which light is used to perform mechanical or micromechanical motions, may be used as electric power control elements, switches, or perform other functions in combined optical waveguide and electrical or electronic systems.

Further, optically-driven actuators are provided for use in a waveguide or optical fiber, the actuators being activated either by a broad range of wavelengths or a selected single wavelength.

In accordance with some embodiments of the present invention, actuators are provided as light-actuated micro-opto-thermo-mechanical systems (MOTMSs). In some MOTMSs, a light-absorbing and expanding member is a solid. In some embodiments, light-actuated MOTMSs are provided in which the light-absorbing and expanding member is a liquid or soft solid (e.g., a polymer) known to have a large coefficient of thermal expansion (CTE).

According to some embodiments, MOTMSs are provided in which the light absorbing and expanding member is a partially absorbing, bimorph micro-mirror, changing its shape or radius of curvature when light impinges on its surface.

MOTMSs are further provided in which a micro-mirror having two micro-flexures as hinges move in response to direct, light-induced force.

According to some embodiments of the present invention, actuation by light enables actuation of movement at an MOTMS through optical fibers and waveguides or through free space, without the need for an additional energy source. The direct actuation may use the force exerted by the light impinging on a hinged mirror.

MOTMS movements of a few microns may be used to intercept an optical beam at its focus. Actuators according to the present invention may be temperature-compensated, designed as an athermal system for reliable operation regardless of temperature changes in the operational environment, and may be used to switch or attenuate light or electric currents.

Actuators according to some embodiments of the present invention react proportionally to input signals.

Direct, light-induced front-surface heating of a micro-mirror may move and spread the retro-reflected light beam in some actuators of the present invention.

The above summary of the present invention is not intended to represent each embodiment, or every aspect, of the present invention. This is the purpose of the figures and the detailed description, which follow.

BRIEF DESCRIPTION OF THE DRAWINGS

The foregoing and other advantages of the invention will become apparent upon reading the following detailed description and upon reference to the drawings.

FIG. 5b is a schematic cross-sectional view of the micro-mirror of FIG. 5a.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF PREFERRED EMBODIMENTS

Figure 1:
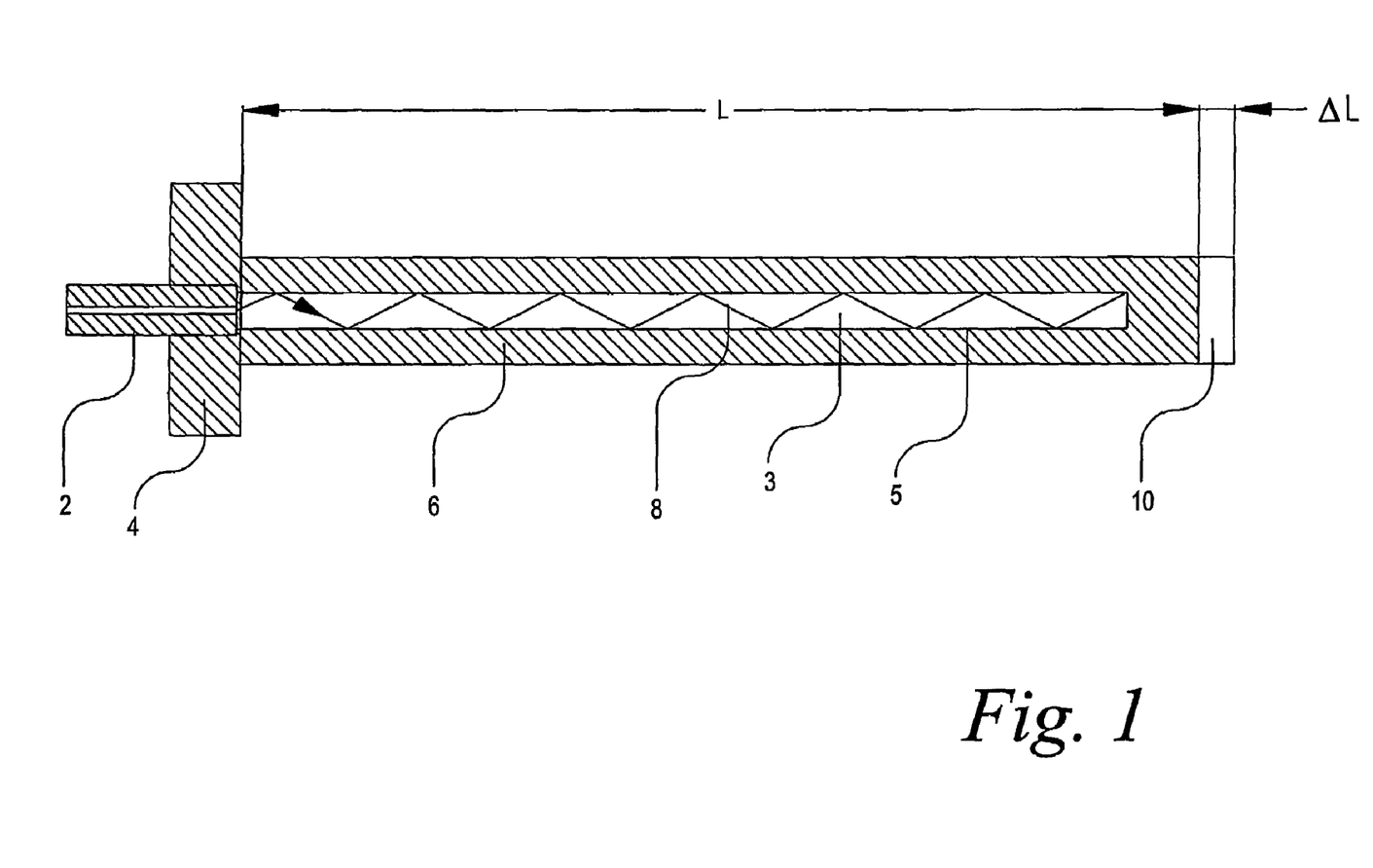
FIG. 1 is a schematic, cross-sectional view of an optical actuator.

Referring now to FIG. 1, there is shown an optical fiber 2 leading a light beam 8 into a linear optical actuator 6, having a hollow, partially absorbing and partially reflecting internal volume 3 where the light beam 8 is absorbed when it impinges multiple times on the walls. As a result of the light absorbed by the linear actuator 6, heat is generated in the solid part of the actuator 6 and its length changes from its original length L, adding an additional length 10, to the new length L+ΔL. The optical fiber 2 and the actuator 6 are mounted on a base 4 that may serve as a reference point for measurements. The partially absorbing and partially reflecting internal volume may have a surface 5 made of a variety of different materials. For example, the inner surface 5 of the internal volume may be exposed aluminum or silicon having absorption values of a few percent (for example, up to about seven or eight percent). The inner surface 5 may be coated with an absorbing coating having a high absorption (for example, an absorption of up to about 50%).

In some embodiments, the use of a low-absorption material at the inner surface 5 is advantageous to cause absorption along the length of the linear actuator 6. For example, an actuation length ΔL of about 2.5 micrometers can be achieved using an aluminum actuator 6 having a length L of about 1 mm and heated by absorbed light to about 100° C. above the environmental temperature. Cooling down after heating is accomplished by heat transfer to the base 4 and to the environment.

The actuator 6 of FIG. 1 may absorb broadband light and may be actuated by all light bands commonly used in optical communication systems, e.g., at wavelengths of about 0.8, 1.3, and 1.5 micrometers. Further, the actuator 6 may be actuated by light of a plurality of wavelengths, with the actuator 6 absorbing the sum of the optical powers at different wavelengths. In addition, the actuator 6 of FIG. 1 may be independent of light polarization and may be used with single-mode or multi-mode optical fibers and input beams.

Figure 2:
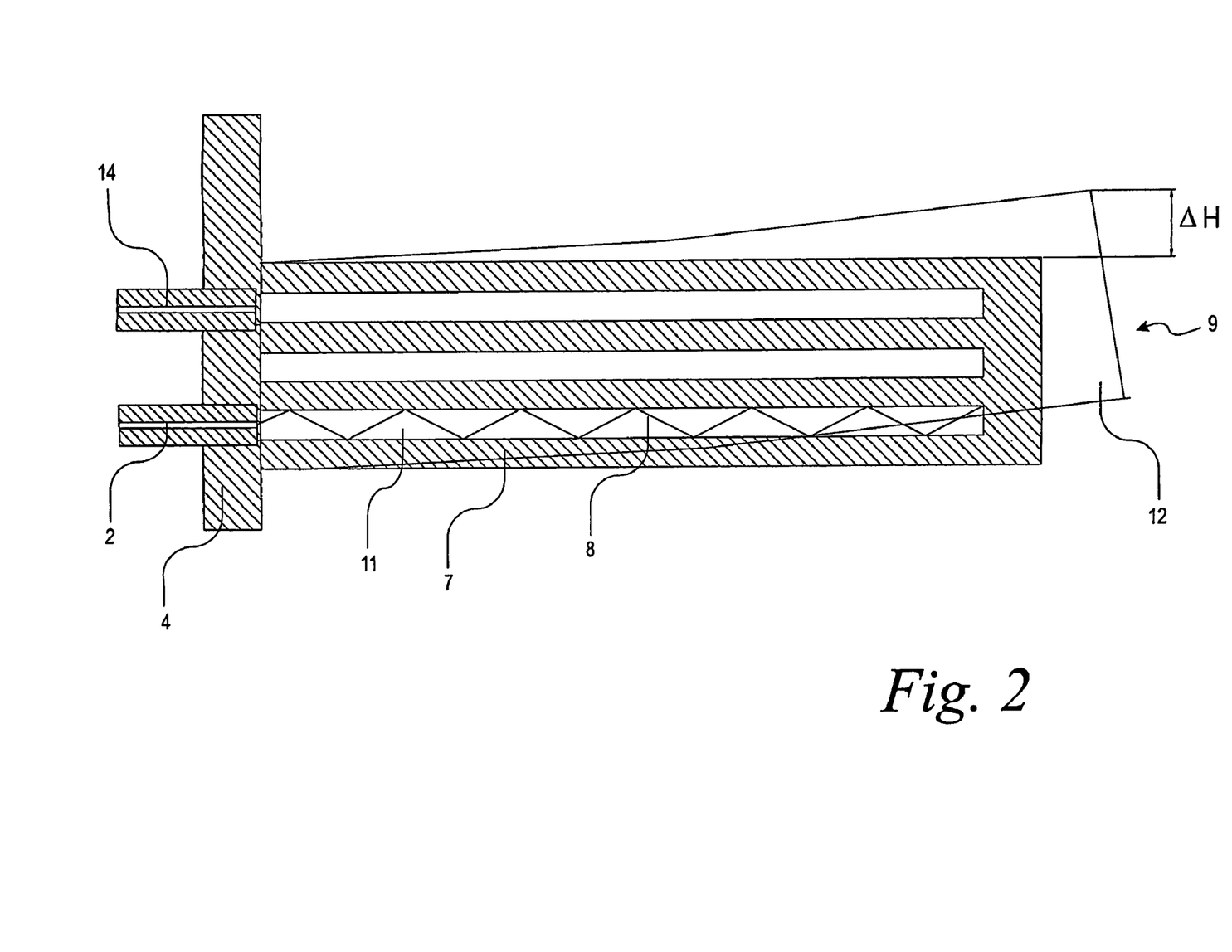
FIG. 2 is a schematic cross-sectional view of a temperature-compensating optical actuator.

The actuator 6 of FIG. 1 exhibits environmental temperature dependence, generating unwanted thermal expansion, which acts as "noise" added to the actuating light "signal." The optical actuator 7 of FIG. 2 provides one way to compensate for this phenomenon.

Referring now to FIG. 2, there is shown an optical fiber 2 leading light beam 8 into an optical actuator 7 having two hollow, partially absorbing and partially reflecting, identical, internal volumes, or two actuators of the type described above with respect to FIG. 1. The two actuators are connected together at their two ends, the base plate 4 and the opposite end 9, thus constructing a rectangular rigid frame of a single material. When the light beam 8 is absorbed, after it impinges multiple times in its hollow volume 11 the hot arm of the rectangular frame expands, and the actuator 7 assumes the shape 12, having lateral movement ΔH. The lateral movement ΔH is independent of environmental temperature due to the symmetry of the shape 6, that remains rectangular at temperature changes affecting the whole structure (i.e., the structure is "soaked" in the environmental temperature). The actuator 7 of FIG. 2 can react to the sum of light beams when they are introduced in the same port or fiber, e.g. fiber 2. The actuator 7 can react proportionally to the difference in the powers of two light beams when the two beams are introduced in different ports or fibers, e.g., one in a first fiber 2 and the other in a second fiber 14. The structure can be micro-machined, and the absorbing volumes can be of round or rectangular cross section, for example. According to some embodiments, the displacement ΔH is few microns for heating powers of few tens of milliwatts, making this a low-power-consumption system.

Figure 3A:
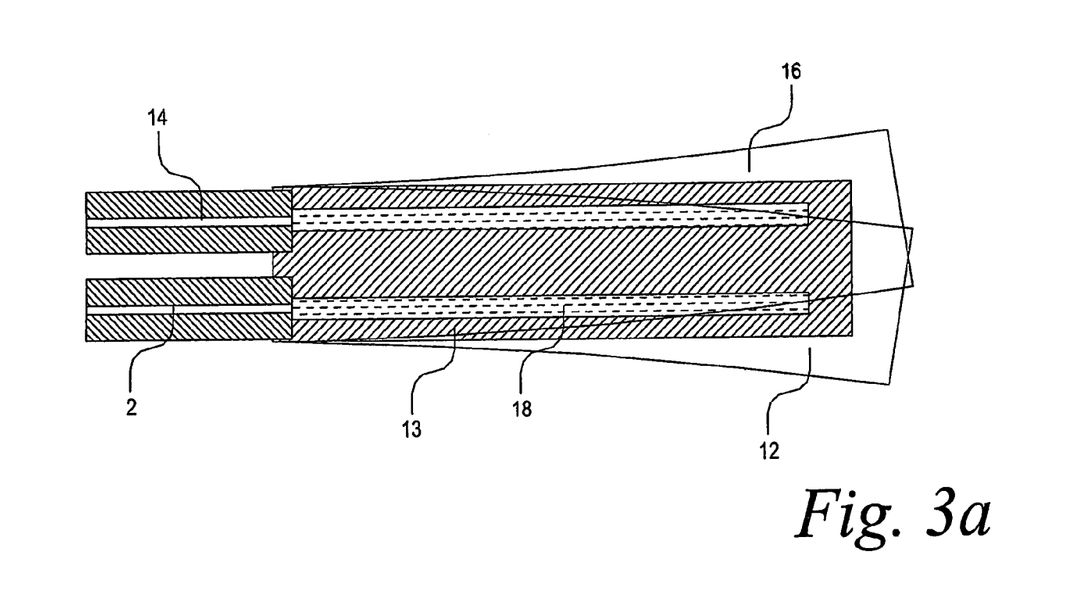
FIG. 3a is a side schematic cross-sectional view of a two-dimensional optical actuator.
Figure 3B:
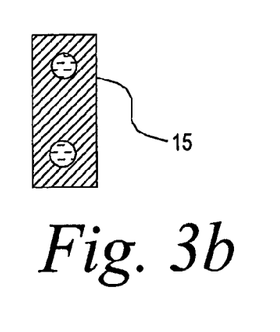
FIG. 3b is an end cross-sectional view of an optical actuator having two cavities.
Figure 3C:
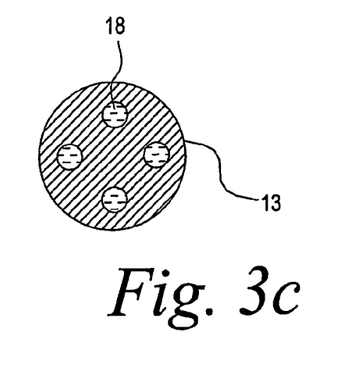
FIG. 3c is an end cross-sectional view of an optical actuator having four cavities.

FIG. 3a illustrates an actuator capable of being actuated in two lateral dimensions. FIG. 3b shows an end cross-sectional view of an optical actuator 15 having two volumes for absorbing energy. FIG. 3c shows a cross-sectional view of the actuator 13 of FIG. 3a. The actuator 13 of FIG. 3a can be actuated in two lateral directions. Introducing light into any of the four or into more than one absorbing volume 18, will actuate the end in two lateral dimensions. For example, light input via a first fiber 2 will change the shape of the actuator 13 in the direction shown by alternative shape 16 and light input via a second fiber 14 will change the shape of the actuator 13 in the direction shown by the alternative shape 14. The same principle is applied perpendicular to the plane of the drawing creating two-dimensional movement into and out of the plane of the drawing.

Some embodiments of actuators use an absorbing fill material in a light-absorbing volume. Liquids or soft solids such as polymers may be employed for this purpose. Because some liquids and polymers have large coefficients of thermal expansion, larger actuation distances may be achieved by placing the materials into the light-absorbing volumes. Such liquids and polymers may be encapsulated within metallic, semiconductor material, glass, or silica material containment areas. For example, the bodies of actuators 6, 7, and 13—shown respectively in FIGS. 1, 2, and 3a—may be constructed of metals, semiconductor materials, glass, or silica for the containment of liquids and polymers. Filling techniques, in-situ polymerization techniques, and high-pressure sealing techniques may be employed to insert and contain liquid and polymeric materials in light-absorption cavities.

Figure 4:
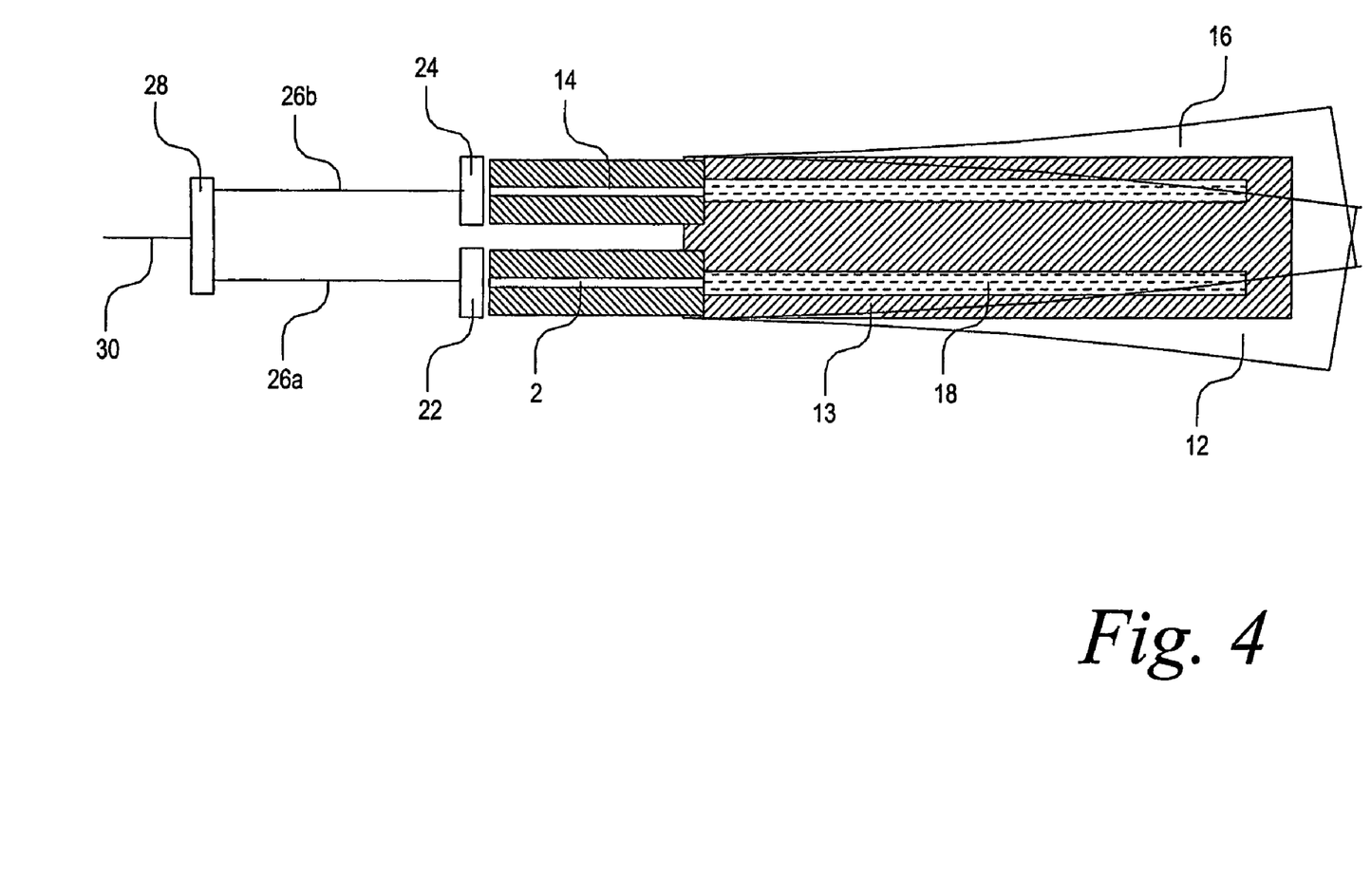
FIG. 4 is a schematic cross-sectional view of an optical actuator employing light filtration.

FIG. 4 illustrates multi-wavelength, two-dimensional actuation of the actuator 13 shown in FIG. 3a. A main optical fiber 30 brings four actuating light signals to the site; there an optical splitter 28 splits the signal into 4 multi-wavelength signals 26 (two signals are visible in FIG. 4; unshown signals extend out of the plane of the drawing). A first branch 26a of the multi-wavelength signal is introduced into a first fiber 2 through a first optical filter 22, with the optical filter 22 letting through substantially only the designated wavelength for this port. A second branch 26b of the multi-wavelength signal passes through a second optical filter 24 on the way to the second fiber 14. In this way one can control two dimensional actuation through a single fiber 30 by altering the wavelengths of actuating signals passed through the main optical fiber 30.

Figure 5A:
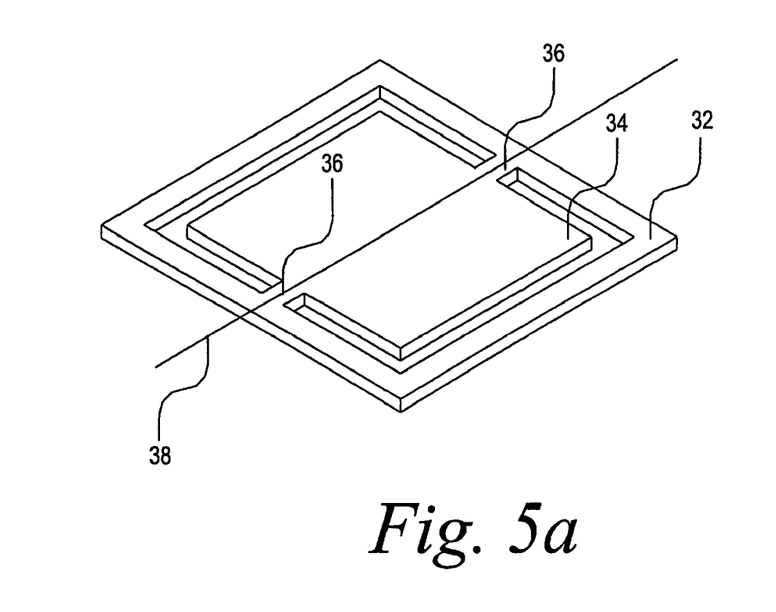
FIG. 5a is a perspective view of a micro-mirror moved by light-induced force and having two micro-flexures as hinges.

FIG. 5a is an isometric view of a direct, light-induced micro-mirror 34. The movement of the micro-mirror 34 is due to pressure or force exerted by light upon the micro-mirror (due to the momentum of the light). The micro-mirror 34 has two micro-flexures 36 as hinges, and the micro-flexures 36 are connected to a rigid frame 32. According to one embodiment, the micro-mirror 34 has an area of 25×25 microns, is 2 microns thick, and is coated with a reflective coating on one or both sides. The flexures are, for example, 3×2 microns in cross section and 5 microns long.

Figure 5B:
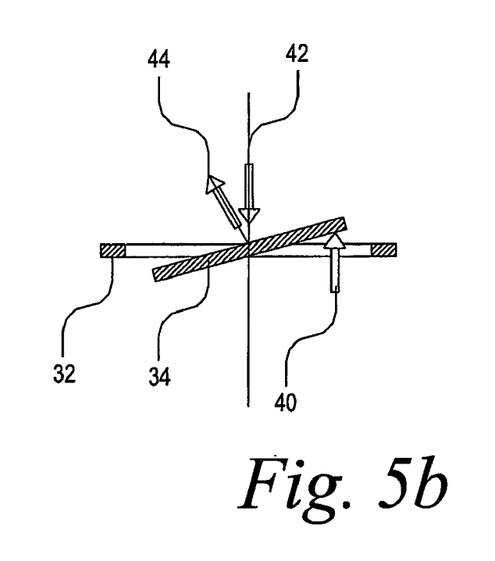

FIG. 5b is a cross-sectional view of the light-induced micro-mirror 34 of FIG. 5a. A signal beam 40, impinging on the mirror 34 away from its rotation axis, creates a moment and pushes the mirror to form an angle with the frame 32. In this way, an optical input beam 42, impinging centered on the axis of rotation of the mirror, which would be normally retro-reflected, is diverted in the direction shown by arrow 44. The angle of deflection is proportional to the force created by the beam 40. One can use a single coating on the mirror 34 and have beams 40 and 42 impinge from the same side, or use double-sided coating and have beams 40 and 42 impinge from two sides as shown in FIG. 5b.

Figure 6A:
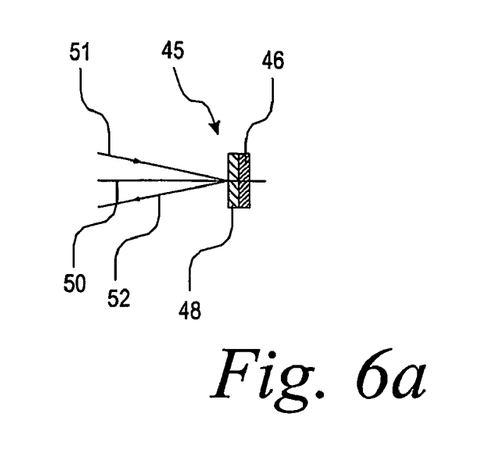
FIG. 6a is a cross-sectional view of an optical actuator employing a bimorph micro-mirror.
Figure 6B:
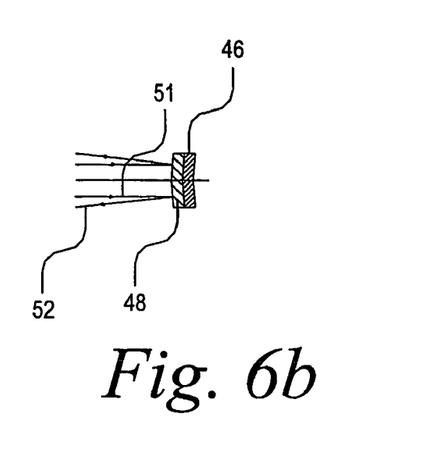
FIG. 6b is a cross-sectional view of an optical actuator of FIG. 6a in its curved state.
Figure 6C:
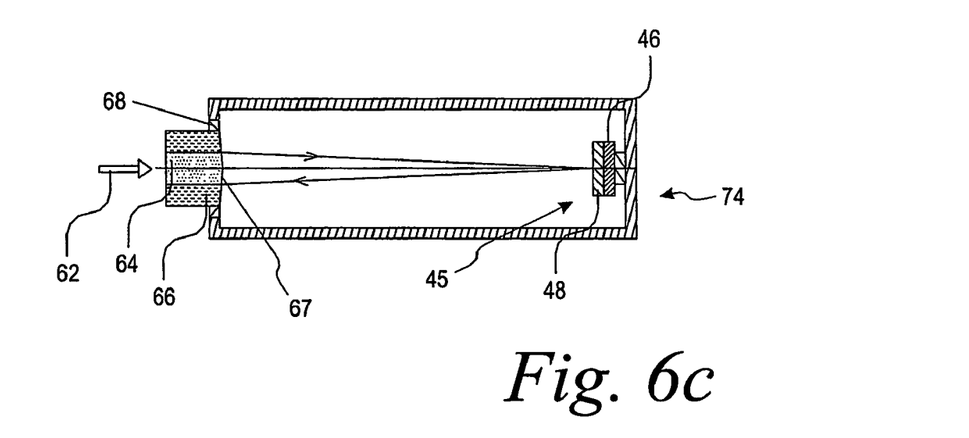
FIG. 6c is a cross-sectional view of an optical actuator employing a bimorph micro-mirror to reflect light that is emitted from a fiber.
Figure 6D:
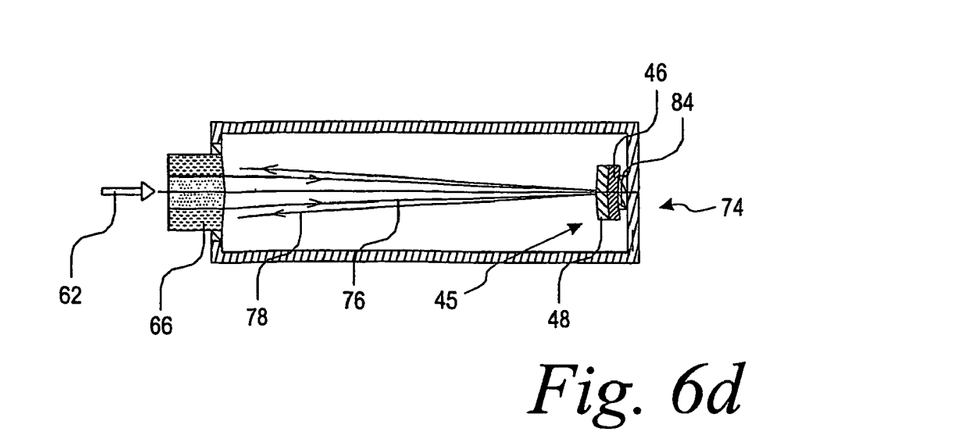
FIG. 6d is a cross-sectional view of the optical actuator of FIG. 6c showing the actuator in its curved state.

FIGS. 6a-6d are schematic cross-sectional views of a light actuated MOTMS in which the light-absorbing and expanding member is a partially absorbing, bimorph micro-mirror 45, made of two different materials 46 and 48—as shown in FIG. 6a—where material 48 has higher CTE than material 46. This bimorph mirror changes its shape or radius of curvature when light impinges on its surface, and becomes a convex mirror as shown in FIG. 6b. The central axis 50 of the bimorph mirror 45 is shown in FIG. 6a. The change in the radius of curvature diverts parts of the impinging beam area 51 out of the reflected beam area 52. In this way a self-actuated limiting or attenuation effect is reached. Higher beam power results in greater curvature of the bimorph mirror, and thus results in more energy being diverted out of the retro-reflected path. Looking at FIG. 6c, we see that the bimorph mirror 45 is flat, at very low power (e.g., a few milliwatts) of the impinging beam 62. The impinging beam 62 enters the assembly 74 through a core 64 of a fiber 66 having a spherical, lens-like exit face 67, strikes the bimorph mirror 45, and is reflected into the core 64 on its way out through fiber 66. The fiber 66 is mounted to the assembly 74 at a fiber holder 68. When higher powers are used (e.g., up to few watts), the situation shown in FIG. 6d results. In FIG. 6d, the bimorph mirror 45 is curved and the cone 76 of the impinging beam is reflected as cone 78, where a certain part of the reflected light misses the core, or aperture, on its way back through fiber 66.

The mirror 48 is mounted to a mirror mount 84. The assembly 74 is designed to be athermal, such that the thermal changes in the curvature of the fiber end 66, the bimorph mirror 45, the length of the mirror mount 84, the shape of the fiber holder 68, and total length of the assembly 74 compensate each other when all are "soaked" in the same environmental temperature. This way, substantially only the heating of the optical beam causes the light to spread wider than the core aperture, preventing conduction back through the fiber 66.

Figure 7A:
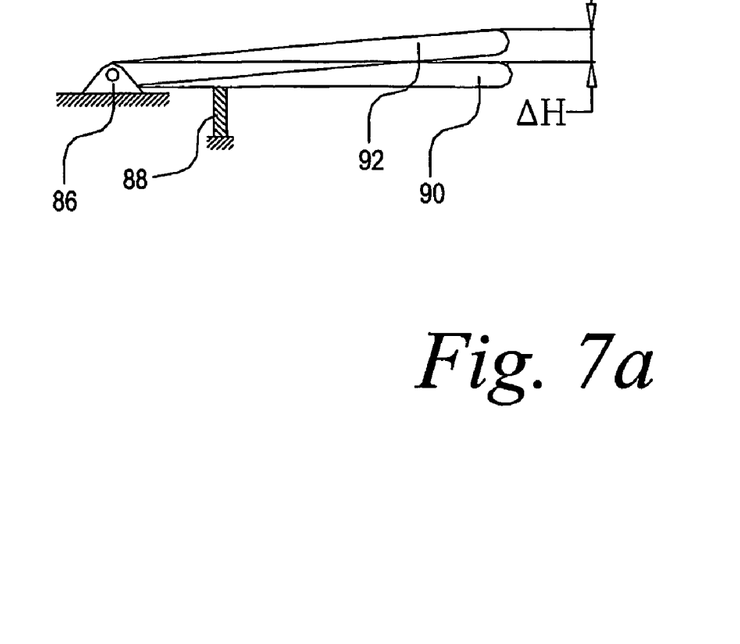
FIG. 7a is a schematic view of a movement extension device according to one embodiment of the present invention.

FIG. 7a is a schematic view of a movement extension device. Movement extension devices may be useful because the light-actuated MOTMSs have small movements (for example, on the order of a few microns to tens of microns). The movement extension device shown in FIG. 7a is a lever. The lever has a hinge 86 and a lever arm 90, that under the action of light-actuated MOTMS 88 changes position to a second position 92, creating lateral movement having a distance ΔH. This movement is larger than the actuator's movement by the ratio of the lever length to the axis-actuator distance, and in some embodiments can be 10 to 20 times larger than the actuator's movement.

Figure 7B:
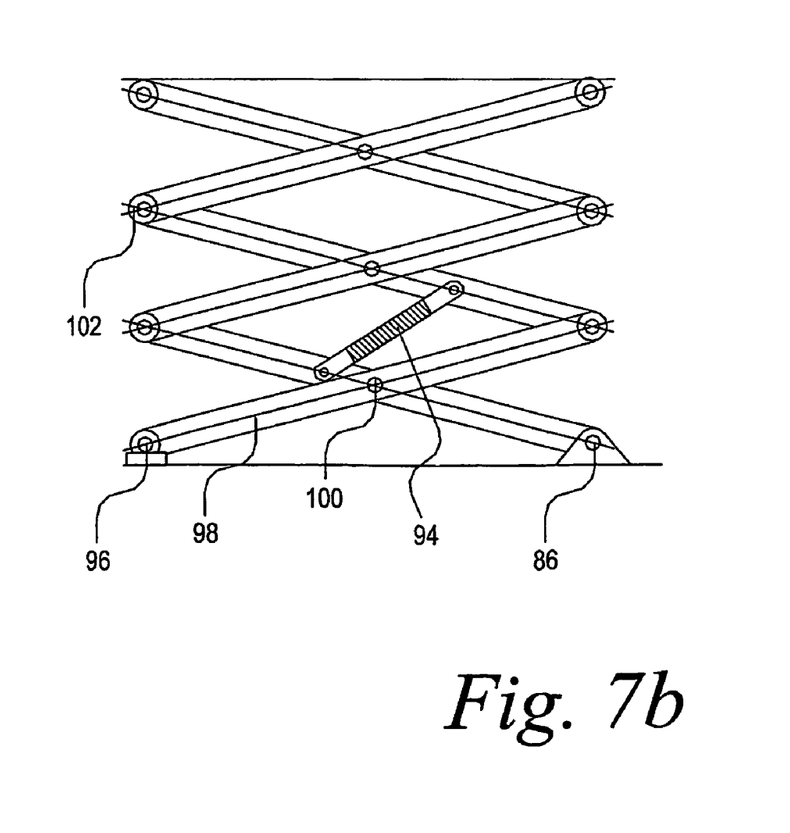
FIG. 7b is a schematic view of an alternative movement extension device.

Larger displacements can be achieved using multiple levers 98 connected to a stable hinge 86 and a sliding hinge 96, as shown in FIG. 7b. Multiple lever arms 98 are connected via central hinges 100 and lateral hinges 102. The optical actuator 94 shown in FIG. 7b can result in displacement multiplications in some embodiments from few tens to a hundred or more when mounted in this way. The whole structure can be micro-machined using flexure hinges.

Figure 8A:
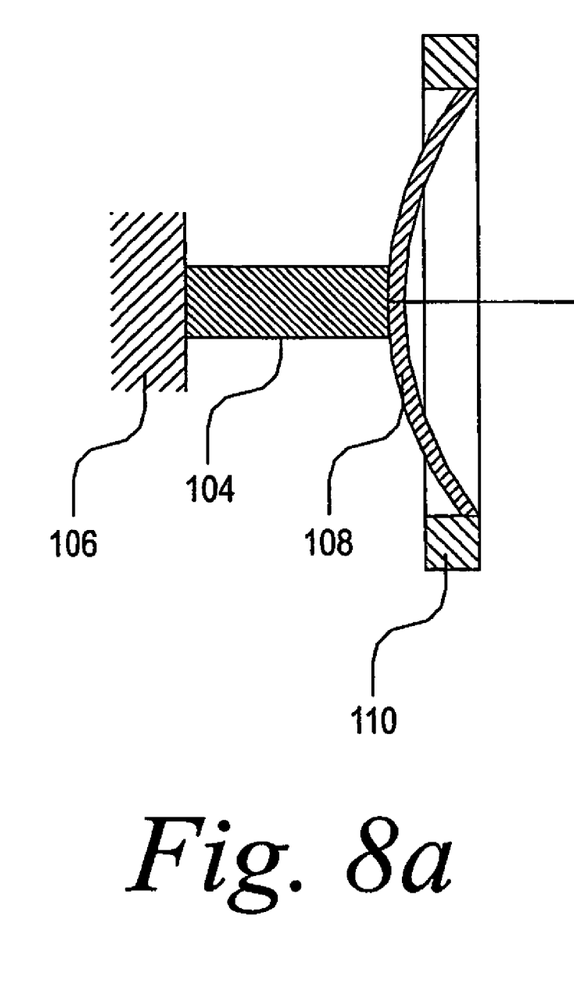
FIG. 8a is a cross-sectional view of a "flip-flop" optical actuator in a first position.
Figure 8B:
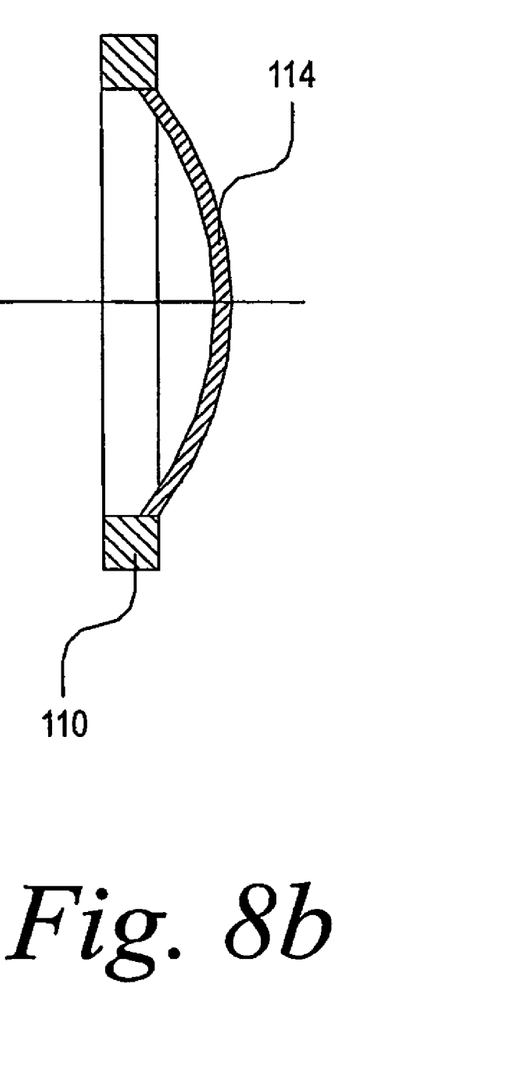
FIG. 8b is a cross-sectional view of a "flip-flop" optical actuator in a second position.

FIGS. 8a and 8b are schematic cross-sectional views of a "flip-flop" optical actuator actuated by an MOTMS 104. The MOTMS 104 is mounted between an MOTMS mount 106 and a shell or strip 108. The spherical or cylindrical shell or strip 108, held by frame 110, "jumps" from its stable position shown in FIG. 8a to its other stable position 114, shown in FIG. 8b, due to the force created by the light-actuated MOTMS 104. Thus the shell or strip 108 may be pushed back to its original shape, shown in FIG. 8a, by force on the center of the shape shown in FIG. 8b manually or using an additional light-actuated MOTMS. According to one embodiment, the frame 110 is a ring.

Optical actuators of the present invention, such as MOTMSs, may incorporate a variety of features not explicitly described above. For example, optical actuators according to the present invention may be designed for multi-color operation, sum-of-colors operation, or single-color operation, and may operate in a broad range of wavelengths. For example, visible light as well as light having wavelengths of from about 980 nm to about 1500 nm may be controlled by actuators according to the present invention. Feedback mechanisms, including passive feedback mechanisms, may be included in actuators according to the present invention for comparing signal beam power with reference beam power. Actuators according to the present invention may employ optical inputs having optical power of from a few milliwatts up to hundreds of milliwatts as inputs. Actuators according to some embodiments of the present invention may be designed to intercept light beams having optical powers of a watt or greater.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical actuator assembly comprising:
   a solid light-absorbing and expanding member having a core being surrounded by a partially absorbing and partially reflecting interior cladding, said core and said cladding forming an interior volume; and
   a waveguide for directing optical energy into said interior volume, said light-absorbing and expanding member expanding in response to light impinging thereon and thereby resulting in displacement of said solid light-absorbing and expanding member to a displacement distance.

2. The optical actuator of claim 1, wherein said core has a longitudinal axis, said solid light-absorbing and expanding member being displaced to a displacement distance along said longitudinal access, said displacement distance being proportional to the power of said optical energy.

3. The optical actuator of claim 1, wherein said interior volume is a closed volume.

4. An optical actuator comprising:
an outer containing member having an interior cladding; and
a core within said interior cladding, said core, having a longitudinal axis and containing a light-absorbing and expanding material selected from the group consisting of liquids, gels, and solids, said light-absorbing and expanding material expanding in response to light impinging thereon and thereby resulting in displacement of said outer containing member to a displacement distance in the direction of said longitudinal axis.

5. The optical actuator of claim 4, wherein said outer containing member is comprised of a material selected from the group consisting of metals, semiconductors, and dielectric material such as glass.

6. The optical actuator of claim 4, wherein said displacement distance is proportional to the power of said light impinging on said light-absorbing and expanding material.

7. An optical actuator comprising:
a first light-absorbing and expanding member comprising a first outer portion and a first cavity having a first longitudinal axis;
a second light-absorbing and expanding member comprising a second outer portion and a second cavity having a second longitudinal axis approximately parallel to said first longitudinal axis;
wherein absorption of light by one of said first light-absorbing cavity and said second light-absorbing cavity causes displacement of at least a portion of said optical actuator to a displacement distance in a direction approximately perpendicular to said first longitudinal axis and said second longitudinal axis.

8. The optical actuator of claim 7 wherein at least one of said first and second cavities is empty.

9. The optical actuator of claim 7 wherein at least one of said first and second cavities is filled with a material selected from the group consisting of liquids and polymers.

10. The optical actuator of claim 7 wherein said displacement distance is proportional to the power of said light absorbed by one of said first and second light-absorbing cavities.

11. The optical actuator of claim 7 wherein thermal changes in an environment of said optical actuator cause substantially no displacement of said optical actuator in a direction approximately perpendicular to said first longitudinal axis and said second longitudinal axis.

12. The optical actuator of claim 7 further comprising a first filter for filtering light input into said first light-absorbing and expanding member and a second filter for filtering light input into said second light-absorbing and expanding member, said filters allowing for controlled actuation of one or both of said first and second light-absorbing and expanding members via the input of multiple colors of light from a single light pathway.

13. The optical actuator of claim 12 wherein said single light pathway is a fiber optic cable.

14. The optical actuator of claim 12 wherein said single light pathway is an optical waveguide.

15. The optical actuator of claim 7, wherein at least one of said first light-absorbing and expanding member and said second light-absorbing and expanding member is comprised of a material selected from the group consisting of metals, semiconductors, and dielectric material such as glass.

16. An optical actuator comprising:
a first light-absorbing and expanding member comprising a first outer portion and a first cavity having a first longitudinal axis;
a second light-absorbing and expanding member comprising a second outer portion and a second cavity having a second longitudinal axis approximately parallel to said first longitudinal axis;
a third light-absorbing and expanding member comprising a third outer portion and a third cavity having a third longitudinal axis approximately parallel to said first longitudinal axis; and
a fourth light-absorbing and expanding member comprising a fourth outer portion and a fourth cavity having a fourth longitudinal axis approximately parallel to said first longitudinal axis;
said first, second, third, and fourth light-absorbing and expanding members being approximately symmetrical and absorption of light at one or more of said first, second, third, and fourth light-absorbing members causes displacement of at least a portion of said optical actuator to a displacement distance in a direction approximately perpendicular to said first longitudinal axis.

17. The optical actuator of claim 16 wherein thermal changes in an environment of said optical actuator cause substantially no displacement of said optical actuator in a direction approximately perpendicular to said first longitudinal axis and said second longitudinal axis.

18. The optical actuator of claim 16 wherein said displacement distance is proportional to the optical power of said light absorbed at one or more of said light-absorbing members.

19. The optical actuator of claim 16 wherein said light-absorbing and expanding members are interconnected in a rigid frame and light input into two or more of said light-absorbing and expanding members allows for two-dimensional displacement of said optical actuator in directions approximately perpendicular to said first longitudinal axis.

20. The optical actuator of claim 16 further comprising:
a first filter for filtering light input into said first light-absorbing and expanding member;
a second filter for filtering light input into said second light-absorbing and expanding member;
a third filter for filtering light input into said third light-absorbing and expanding member; and
a fourth filter for filtering light input into said fourth light-absorbing and expanding member;
said filters allowing for controlled actuation of one or both of said first and second light-absorbing and expanding members via the input of multiple colors of light from a single light pathway.

21. The optical actuator of claim 20 wherein said single light pathway is a fiber optic cable.

22. The optical actuator of claim 20 wherein said single light pathway is an optical waveguide.

23. The optical actuator of claim 16, wherein at least one of said first light-absorbing and expanding member, said second light-absorbing and expanding member, said third light-absorbing and expanding member, and said fourth light-absorbing and expanding member is comprised of a material selected from the group consisting of metals, semiconductors, and dielectric material such as glass.

24. An optical actuator comprising:
a solid member having an internal cavity defined in part by an open end and a closed end, said solid member receiving light of a plurality of wavelengths via said open end;
an internal cladding surrounding at least a portion of said internal cavity, said internal cladding being partially absorbing and partially reflecting, said internal cladding redirecting scattered light of said light for absorption; and
an internal material located in said internal cavity, said internal material being light-absorbing and expanding, said internal material expanding in response to said light impinging thereon and thereby resulting in displacement of said solid member to a displacement distance.

* * * * *

UNITED STATES PATENT AND TRADEMARK OFFICE
CERTIFICATE OF CORRECTION

| | | |
|---|---|---|
| PATENT NO. | : 7,274,855 B2 | Page 1 of 1 |
| APPLICATION NO. | : 10/528608 | |
| DATED | : September 25, 2007 | |
| INVENTOR(S) | : Doron Nevo et al. | |

It is certified that error appears in the above-identified patent and that said Letters Patent is hereby corrected as shown below:

ON TITLE PAGE, after "Prior Publication Data," please insert:

--Related U.S. Application Data
(60)    Provisional application No. 60/412,748, filed Sep. 23, 2002.--

Column 1, Line 3 please insert:

--CROSS REFERENCE TO RELATED APPLICATIONS
This application is a national phase of PCT/IB03/04145 filed September 22, 2003, which claims the benefit of US provisional application number 60/412,748 filed September 23, 2002.--

Signed and Sealed this

First Day of June, 2010

David J. Kappos
*Director of the United States Patent and Trademark Office*